United States Patent
Kim et al.

(10) Patent No.: US 9,215,399 B2
(45) Date of Patent: Dec. 15, 2015

(54) AV SIGNAL STORAGE METHOD AND APPARATUS AND TELEVISION HAVING BROADCAST STREAM STORAGE FUNCTION

(75) Inventors: Deok-ho Kim, Seoul (KR); Kwang-hyun Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1611 days.

(21) Appl. No.: 11/606,049

(22) Filed: Nov. 30, 2006

(65) Prior Publication Data
US 2007/0217757 A1   Sep. 20, 2007

(30) Foreign Application Priority Data
Mar. 18, 2006   (KR) .................. 10-2006-0025087

(51) Int. Cl.
| | |
|---|---|
| H04N 5/76 | (2006.01) |
| H04N 21/4147 | (2011.01) |
| H04N 5/781 | (2006.01) |
| H04N 5/907 | (2006.01) |

(52) U.S. Cl.
CPC ............ *H04N 5/76* (2013.01); *H04N 21/4147* (2013.01); *H04N 5/781* (2013.01); *H04N 5/907* (2013.01)

(58) Field of Classification Search
CPC ...... H04N 21/4147; H04N 5/76; H04N 5/781; H04N 5/907
USPC ................................. 386/239–240; 369/30.23
See application file for complete search history.

(56) References Cited

U.S. PATENT DOCUMENTS

| | | | | |
|---|---|---|---|---|
| 5,257,142 | A * | 10/1993 | Hong ............................... 386/46 |
| 5,898,880 | A * | 4/1999 | Ryu ............................... 713/323 |
| 6,922,833 | B2 * | 7/2005 | Forrer, Jr. ........................ 718/100 |
| 7,072,576 | B2 * | 7/2006 | Tanaka .......................... 386/125 |
| 7,257,308 | B2 * | 8/2007 | Plourde et al. ................... 386/46 |
| 7,783,171 | B2 * | 8/2010 | Ito .................................. 386/125 |
| 2003/0084252 | A1 * | 5/2003 | Talagala ......................... 711/135 |
| 2004/0141718 | A1 * | 7/2004 | Miyagoshi et al. ............. 386/46 |
| 2005/0188409 | A1 * | 8/2005 | Daniels ............................ 725/88 |
| 2005/0210519 | A1 | 9/2005 | Ito |
| 2006/0224875 | A1 * | 10/2006 | Choi et al. ......................... 713/1 |
| 2007/0041718 | A1 * | 2/2007 | Fontijn et al. ................. 386/125 |
| 2007/0097816 | A1 * | 5/2007 | Van Gassel ................ 369/47.33 |
| 2007/0172212 | A1 * | 7/2007 | Miyagawa ..................... 386/125 |
| 2009/0279398 | A1 * | 11/2009 | Altare .......................... 369/47.5 |

FOREIGN PATENT DOCUMENTS

| | | |
|---|---|---|
| CN | 1458794 A | 11/2003 |
| KR | 2004-0066014 A | 7/2004 |

(Continued)

OTHER PUBLICATIONS

Taiwanese Office Action, dated May 30, 2011, issued in Application No. 096101082.

*Primary Examiner* — Gelek W Topgyal
(74) *Attorney, Agent, or Firm* — Sughrue Mion, PLLC

(57) ABSTRACT

Provided are an AV signal storage method and apparatus and a television (TV) having an AV signal storage function. The method includes storing an AV signal in a first storage unit when the AV signal is received; storing the received AV signal in a second storage unit when the second storage unit is driven; and outputting AV signal stored in one of the first storage unit and the second storage unit when a request for the output of the AV signal is received.

18 Claims, 9 Drawing Sheets

(56) References Cited

FOREIGN PATENT DOCUMENTS

| | | | |
|---|---|---|---|
| KR | 10-2005-0052719 A | 6/2005 | |
| KR | 10-2005-0078115 A | 8/2005 | |
| WO | WO 96/33579 A1 | 10/1996 | |
| WO | WO 00/60918 A2 | 10/2000 | |

\* cited by examiner

AV SIGNAL STORAGE METHOD AND APPARATUS AND TELEVISION HAVING BROADCAST STREAM STORAGE FUNCTION

This application claims the priority of Korean Patent Application No. 10-2006-0025087, filed on Mar. 18, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to an AV (Audio Video) signal storage method and apparatus and a television (TV) having an AV signal storage function, and more particularly, to an AV signal storage method and apparatus for efficiently managing storage units and a TV having an AV signal storage function.

2. Description of the Related Art

A major example of broadcast stream storage apparatuses is personal video recorder (PVR) systems. PVR systems can receive an AV signal (or AV data, or AV stream). The AV signal can include a broadcast stream. Accordingly, an AV signal storage function can be defined as a broadcast stream storage function.

PVR systems are also called digital video recorder (DVR) systems. PVR systems include storage units such as hard disk drives (HDDs) which store, in real time, a stream of broadcasting programs (or a broadcast stream) transmitted from a broadcasting station and reproduce the stream at a time desired by a user.

Unlike conventional analog video cassette recorders (VCRs), HDD-embedded PVR systems store audio and video information as digital data. Therefore, the HDD-embedded PVR systems can guarantee lossless image quality despite the unlimited reproduction of the digital data and provide functions similar to those of VCRs.

A core function of PVR systems is a time shift function which enables a viewer to simultaneously store and reproduce a broadcasting program that the viewer is watching on television (TV). For example, when a viewer is interrupted by a phone call while watching a broadcasting program, if the viewer presses a pause button on a remote control, broadcast streams received thereafter are stored in a hard disk. After the phone call, if the viewer presses a playback button on the remote control, the viewer can watch the broadcasting program from a scene temporally stopped and thereafter stored in the hard disk. In other words, PVR systems can simultaneously perform storing and reproducing operations at regular time intervals using the time shift function.

TVs having a PVR function also have the time shift function described above.

To provide the time shift function, conventional PVR systems or TVs having the PVR function keep embedded HDDs always turned on. However, after initial driving, the HDD, which is set ON, rotate more than 5400-7200 RPM per minute. Consequently, if the HDD is always kept ON the life of the HDDs is shortened, which, in turn, shortens the life of PVR systems or TVs having the PVR function.

In addition, the time spent on initially driving the HDDs results in a loss in received broadcast streams and delays an output of the received broadcast streams.

SUMMARY OF THE INVENTION

An aspect of the present invention provides an AV signal (or broadcast stream) storage method and apparatus which can lengthen the life of a storage unit or a television (TV) having an AV signal storage function.

Another aspect of the present invention also provides an AV signal (or broadcast stream) storage method and apparatus which can prevent a received AV signal (or broadcast stream) from being lost during an initial driving operation of a storage unit and prevent an output delay of the received AV signal (or broadcast stream), and a TV having an AV signal storage function.

According to an aspect of the present invention, there is provided an AV signal storage method used by an apparatus which comprises a first storage unit and a second storage unit, the method comprising: storing an AV signal in the first storage unit when the AV signal is received; storing the received AV signal stream in the second storage unit when the second storage unit is driven; and outputting AV signal stored in one of the first storage unit and the second storage unit when a request for the output of the AV signal is received.

The method may further include transmitting the AV signal stored in the first storage unit to the second storage unit when the second storage unit is driven.

The outputting of the AV signal may include outputting the AV signal stored in the first storage unit when the second storage unit is not driven and outputting the AV signal stored in the second storage unit when the second storage unit is driven.

According to another aspect of the present invention, there is provided an AV signal storage apparatus including: a first storage unit storing an AV signal when the AV signal is received; a second storage unit storing the received AV signal when the second storage unit is driven; an output unit outputting AV signal stored in one of the first storage unit and the second storage unit when a request for the output of the AV signal is received; and a control unit controlling operations of the first storage unit, the second storage unit, and the output unit according to whether the second storage unit is driven and controlling the operation of the output unit when the request for the output of the AV signal is received.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

The exemplary embodiments of the present invention will be described storing a signal based on a broadcast stream. However, the present invention can be adapted to storing an AV (Audio Video) signal.

Figure 1:
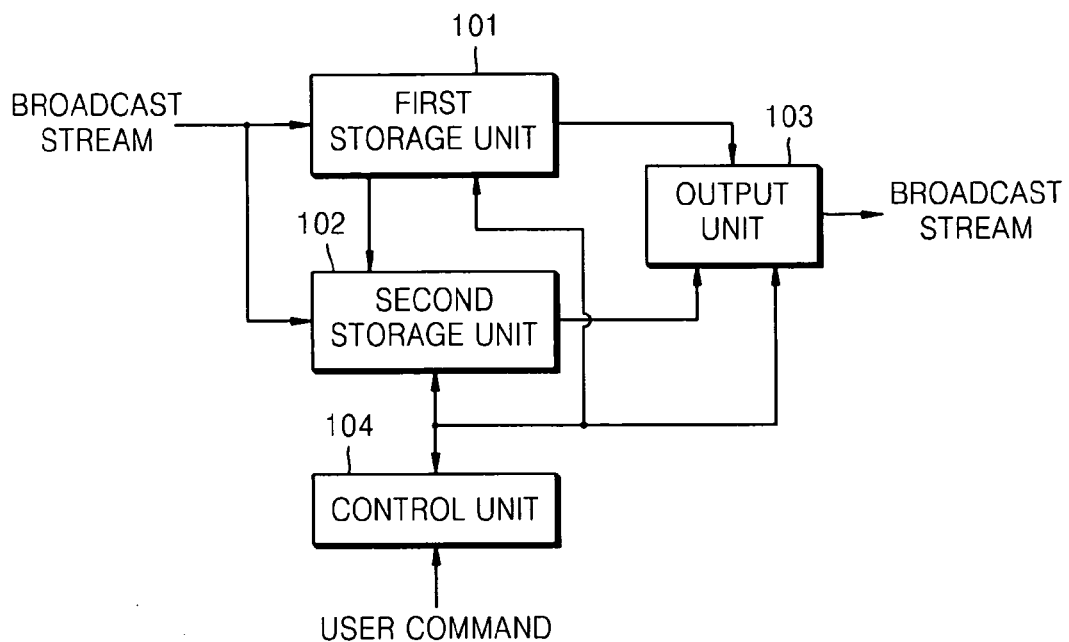
FIG. 1 is a functional block diagram of an AV signal (or a broadcast stream) storage apparatus according to an exemplary embodiment of the present invention.

FIG. 1 is a functional block diagram of a broadcast stream storage apparatus according to an exemplary embodiment of the present invention. The functional block diagram of FIG. 1 may be defined as a functional block diagram of a personal video recorder (PVR) system. Referring to FIG. 1, the broadcast stream storage apparatus includes a first storage unit 101, a second storage unit 102, an output unit 103, and a control unit 104.

The first storage unit 101 receives broadcast streams and stores the received broadcast streams under the control of the control unit 104. The first storage unit 101 may be a memory such as a flash memory.

The second storage unit 102, which is controlled and driven by the control unit 104, stores broadcast streams received. After the second storage unit 102 is set on by the control unit 104 and completes an initial driving operation, the second storage unit 102 is set as a normal driving state and then the second storage unit 102 stores the received broadcast streams. The second storage unit 102 may be a recording medium such as a hard disk drive (HDD).

When requested to output a broadcast stream, the output unit 103 outputs one of the broadcast streams stored in the first storage unit 101 and the second storage unit 102 under the control of the control unit 104. In other words, when the second storage unit 102 is not driven, the output unit 103 outputs broadcast stream data stored in the first storage unit 101 under the control of the control unit 104. When the second storage unit 102 is driven, the output unit 103 outputs broadcast stream data stored in the second storage unit 102 under the control of the control unit 104. To this end, the output unit 103 may be implemented as a switch whose operation is controlled by the control unit 104.

The control unit 104 controls the operations of the first and second storage units 101 and 102 according to whether the second storage unit 102 is driven or not. In other words, when an input user command is a request for the storage of a received broadcast stream, the control unit 104 sets the second storage unit 102 on. Accordingly, the second storage unit 102 starts the initial driving operation.

The second storage unit 102 is not in the normal driving state until it completes the initial driving operation after being set on. Therefore, the control unit 104 controls the first storage unit 101 to store received broadcast streams until the second storage unit 102 completes the initial driving operation after being set on.

When the second storage unit 102 completes the initial driving operation and is driven normally, the control unit 104 controls the operations of the first storage unit 101 and the second storage unit 102 so that received broadcast streams are stored in the second storage unit 102. In this case, the control unit 104 controls the operations of the first and second storage units 101 and 102 so that the broadcast stream data stored in the first storage unit 101 is transmitted to the second storage unit 102. The control unit 104 may manage a write address of the broadcast stream data so that the broadcast stream data stored in the first storage unit 101 and the broadcast stream data to be stored in the second storage unit 102 have continuity.

When an input user command is a request for the output of a broadcast stream, the control unit 104 controls the operation of the output unit 103 according to whether the second storage unit 102 is driven or not. In other words, when an input user command is a request for the output of a broadcast stream, and the second storage unit 102 is not driven, the control unit 104 controls the output unit 103 to output the broadcast stream data stored in the first storage unit 101. In this case, the control unit 104 controls the first storage unit 101 to transmit the broadcast stream data stored in the first storage unit 101 to the output unit 103.

When the input user command is a request for the output of a broadcast stream, and the second storage unit 102 is driven, the control unit 104 controls the output unit 103 to output the broadcast stream data stored in the second storage unit 102. In this case, the control unit 104 controls the operations of the first and second storage units 101 and 102 so that the broadcast stream data stored in the second storage unit 102 is transmitted to the output unit 103.

When the input user command is a request to release the request for the storage of received broadcast streams, the control unit 104 sets the second storage unit 102 off. Accordingly, the second storage unit 102 stops driving. In this case, the control unit 104 may output the received broadcast streams using the first storage unit 101 and the output unit 103. However, the control unit 104 may stop the first storage unit 101 and the output unit 103.

Figure 2:
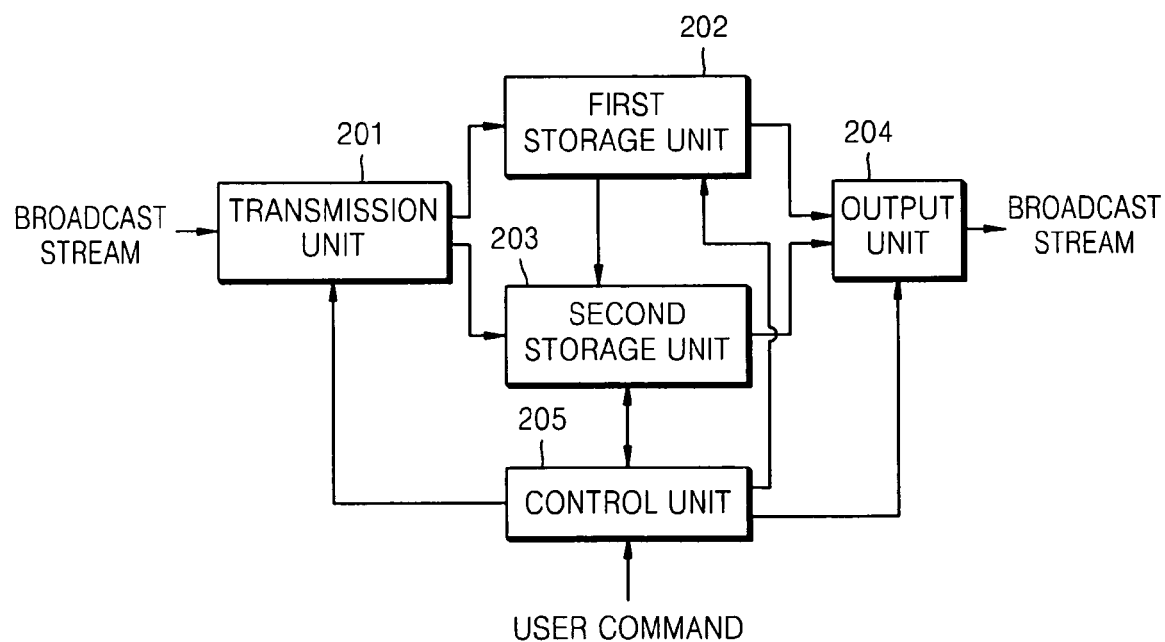
FIG. 2 is a functional block diagram of an AV signal (or a broadcast stream) storage apparatus according to another exemplary embodiment of the present invention.

FIG. 2 is a functional block diagram of a broadcast stream storage apparatus according to another exemplary embodiment of the present invention. The functional block diagram of FIG. 2 may be defined as a functional block diagram of a PVR system. Referring to FIG. 2, the broadcast stream storage apparatus includes a transmission unit 201, a first storage unit 202, a second storage unit 203, an output unit 204, and a control unit 205.

When the second storage unit 203 is not driven, the transmission unit 201 transmits received broadcast streams to the first storage unit 202 under the control of the control unit 205. When the second storage unit 203 is driven, the transmission unit 201 transmits received broadcast streams to the second storage unit 202 under the control of the control unit 205. To this end, the transmission unit 201 may be implemented as a switch whose operation is controlled by the control unit 205.

The first storage unit 202 receives broadcast streams transmitted from the transmission unit 201 and stores the received broadcast streams under the control of the control unit 205. The second storage unit 203 operates in the same way as the second storage unit 102 illustrated in FIG. 2. Broadcast stream data stored in the first storage unit 202 have a digital form. The first storage unit 202 may be a memory such as a flash memory.

When requested to store a broadcast stream, the second storage unit 203 is set on by the control unit 205 and performs the initial driving operation. When the second storage unit 203 is driven normally after the initial driving operation, the second storage unit 203 stores received broadcast streams. If the broadcast stream storage apparatus of FIG. 2 is a PVR system, the request for the storage of the broadcast stream corresponds to a request to perform a PVR function. The request to perform the PVR function may be generated by a pause event. The second storage unit 203 may be a recording medium such as an HDD. Therefore, broadcast stream data stored in the second storage unit 203 may have a digital form.

When requested to output a broadcast stream, the output unit 204 outputs one of the broadcast stream data stored in the first and second storage units 202 and 203, under the control of the control unit 205. In other words, when the second storage unit 203 is not driven normally, the output unit 204 outputs broadcast stream data stored in the first storage unit 201 under the control of the control unit 205. When the second storage unit 203 is driven normally, the output unit 204 outputs broadcast stream data stored in the second storage unit 203 under the control of the control unit 205.

Data output from the output unit 204 is broadcast stream data in digital form. While the request for the storage of a broadcast stream is generated by the pause event, the request for the output of the broadcast stream is generated by a pause releasing event. Transmitting broadcast stream data from the first storage unit 202 or the second storage unit 203 to the output unit 204 may be defined as pushing the broadcast stream data from the first storage unit 202 or the second storage unit 203 to the output unit 204.

When an input user command is the request for the storage of a broadcast stream, the control unit 205 sets the second storage unit 203 on while controlling the transmission unit 201 to transmit a received broadcast stream to the first storage unit 202. Accordingly, the received broadcast stream is stored in the first storage unit 202.

Then, the control unit 205 monitors the operating state of the second storage unit 203. When the second storage unit 203 completes the initial driving operation before a user command requesting the output of a broadcast stream is input, the control unit 205 controls the first storage unit 202 to transmit (or move) broadcast stream data stored in the first storage unit 202 to the second storage unit 203. Such transmission can be defined as dumping since broadcast stream data stored in the first storage unit 202 can be transmitted to the second storage unit 203 at one time.

When the control unit 205 receives a user command requesting the output of a broadcast stream after the initial driving operation of the second storage unit 203 is completed, it controls the operations of the second storage unit 203 and the output unit 204 so that the broadcast stream data stored in the second storage unit 203 can be output.

However, when receiving the user command requesting the output of a broadcast stream before the initial driving operation of the second storage unit 203 is completed, the control unit 205 controls the operations of the first storage unit 202 and the output unit 204 so that the broadcast stream data stored in the first storage unit 202 can be output.

When the second storage unit 203 is driven normally, the control unit 205 controls the operations of the second storage unit 203 and the output unit 204 so that the broadcast stream data stored in the second storage unit 203 can be output. In this case, the controls unit 205 controls the operations of the first storage unit 202, the second storage unit 203, and the output unit 204 so that the broadcast stream data output from the first storage unit 202 and the broadcast stream data output from the second storage unit 203 are reproduced as continuous broadcast stream data.

When a source from which broadcast stream data is transmitted to the output unit 204 is changed from the first storage unit 202 to the second storage unit 203, the control unit 205 may manage write addresses and read addresses of the first storage unit 202 and second storage unit 203 so that broadcast stream data is continuously being read into read addresses. For example, when a read address of broadcast stream data output from the first storage unit 202 is 0000 0011, and the source from which broadcast stream data is transmitted to the output unit 204 is changed to the second storage unit 203, the control unit 205 may control the second storage unit 203 so that broadcast stream data of a read address corresponding to 0000 0100 of the second storage unit 203 can be read. In this case, the control unit 205 may manage the write addresses of the first storage unit 202 and second storage unit 203 so that the broadcast stream data is continuously being read from the second storage unit 203 after the broadcast stream data is read from the first storage unit 202.

When a user requests to release the request for the storage of a broadcast stream, the control unit 205 sets the second storage unit 203 off, thereby stopping the second storage unit 203 from driving. In this case, the control unit 205 can stop the transmission unit 201, the first storage unit 202, and the output unit 204 from driving.

A user command may be input using a remote control (not shown) or using functional buttons on a front panel of the broadcast stream storage apparatus.

Therefore, broadcast streams received before the second storage unit 203 is driven are normally stored in the first storage unit 202 and reproduced accordingly. Consequently, the number of broadcast streams lost during the initial driving operation of the second storage unit 203 can be minimized, and the output delay of received broadcast streams can also be minimized.

When the storing of broadcast streams or the outputting of stored broadcast streams is not performed, the broadcast stream storage apparatus of FIG. 2 drives the transmission unit 201, the first storage unit 202 and the output unit 204, and sets the second storage unit 203 off. In this way, the broadcast stream storage apparatus of FIG. 2 can receive broadcast streams and output the received broadcast streams.

Figure 3:
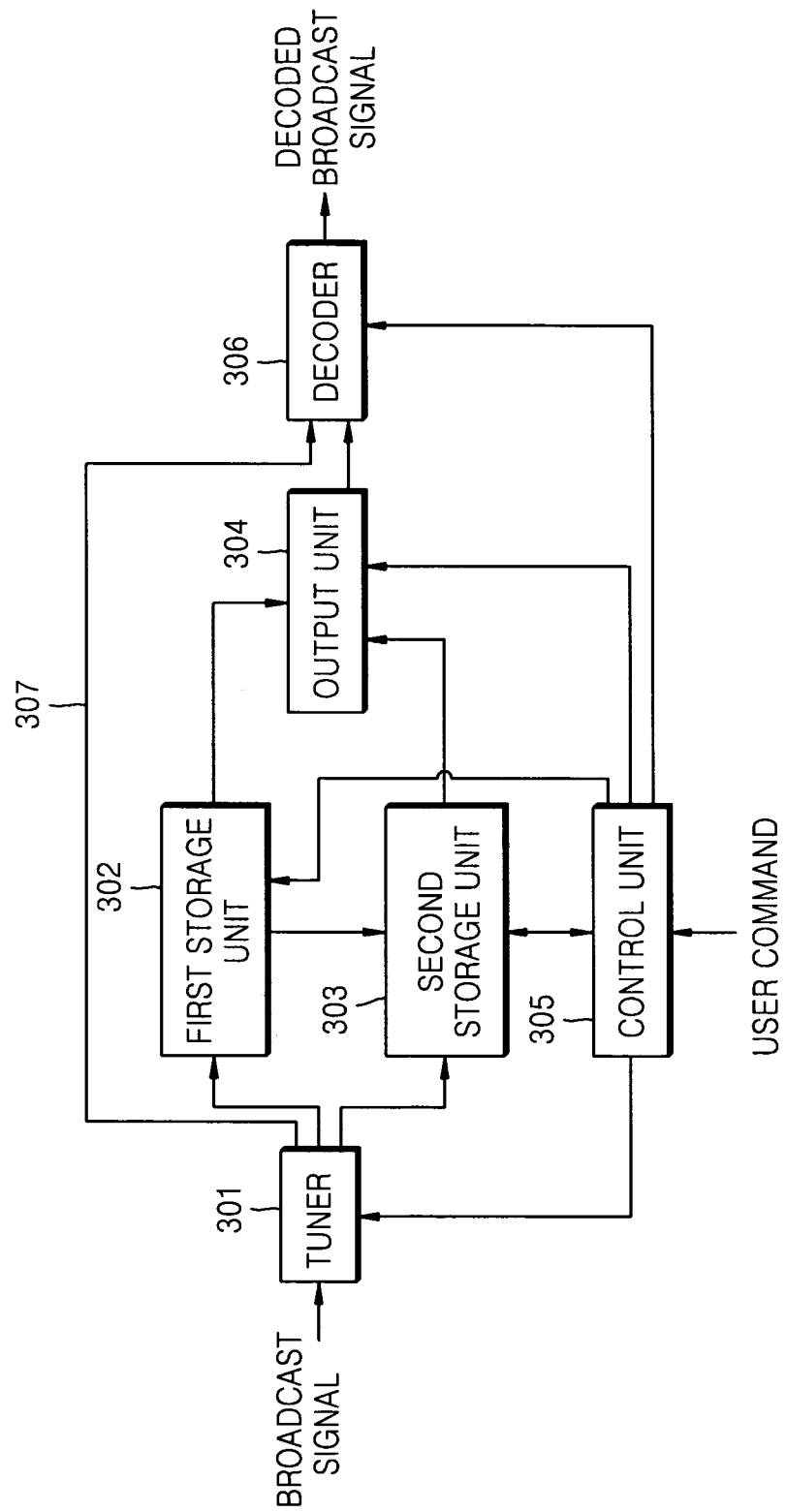
FIG. 3 is a functional block diagram of a television (TV) having an AV signal (or a broadcast stream) storage function according to an exemplary embodiment of the present invention.

FIG. 3 is a functional block diagram of a television (TV) having a broadcast stream storage function according to an embodiment of the present invention. Referring to FIG. 3, the TV includes a tuner 301, a first storage unit 302, a second storage unit 303, an output unit 304, a control unit 305, and a decoder 306.

Controlled by the control unit 305, the tuner 301 receives a broadcast signal of a channel desired by a user. The tuner 301 outputs the received broadcast signal as a digital broadcast stream.

The structures and operations of the first storage unit 302, the second storage unit 303, the output unit 304, and the control unit 305 are identical to those of the first storage unit 101, the second storage unit 102, the output unit 103, and the control unit 104 of FIG. 1, respectively.

When an input user command is a request for the storage of a broadcast stream, the first storage unit 302, the second storage unit 303 and the control unit 305 are driven and store a broadcast stream output from the tuner 301.

When the input user command is a request for the output of a broadcast stream, the first storage unit 302, the second storage unit 303, the output unit 304, and the control unit 305 are driven, and the broadcast stream data stored in either the first storage unit 302 or the second storage unit 303 is output.

When the input user command is a request to release the request for the storage of a broadcast stream, the control unit 305 stops the second storage unit 303 from driving.

When requested to output a broadcast stream after the request for the storage of a broadcast stream is received, the decoder 306 decodes broadcast stream data output from the output unit 304 and outputs the decoded broadcast stream data. When the request for the storage of the broadcast stream is generated by a pause event, the request for the output of the broadcast stream is generated by a pause releasing event.

When the TV operates in a normal broadcasting receiving mode, the decoder 306 decodes broadcast stream data transmitted from the tuner 301 through a line 307 and outputs the decoded broadcast stream data.

The TV of FIG. 3 may be implemented so that the broadcast stream data output from the tuner 301 is transmitted to the decoder 306 through the first storage unit 302 and the output unit 304, and not through the line 307, when the TV is in the normal broadcasting receiving mode. In this case, the line 307 in the TV of FIG. 3 is removed. When the TV is in the normal broadcasting receiving mode, the TV may output received broadcast streams using the first storage unit 302 and the output unit 304 and set the second storage unit 303 off.

Figure 4:
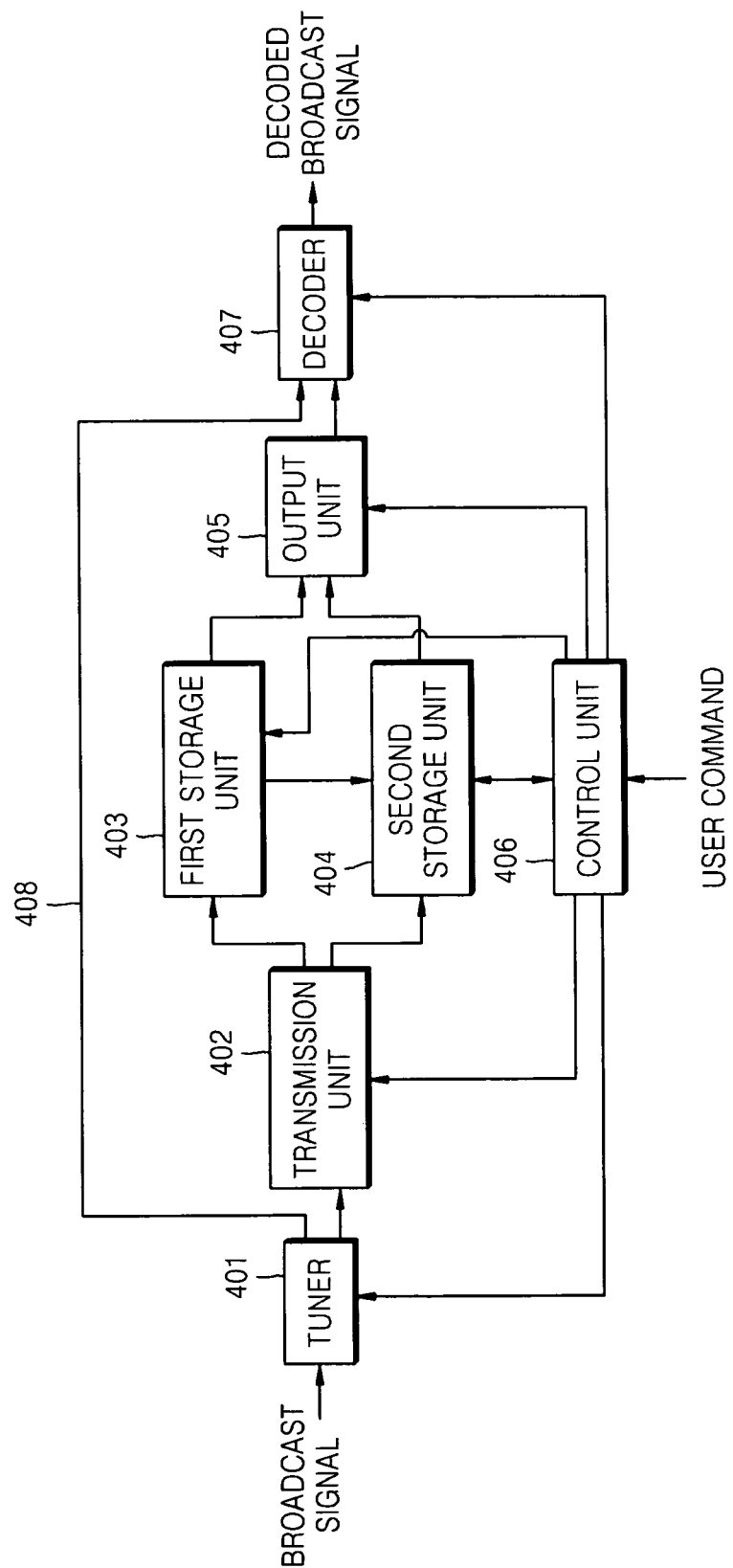
FIG. 4 is a functional block diagram of a TV having an AV signal (or a broadcast stream) storage function according to another exemplary embodiment of the present invention.

FIG. 4 is a functional block diagram of a TV having a broadcast stream storage function according to another exemplary embodiment of the present invention. Referring to FIG. 4, the TV includes a tuner 401, a transmission unit 402, a first storage unit 403, a second storage unit 404, an output unit 405, a control unit 406, and a decoder 407.

Controlled by the control unit 406, the tuner 401 receives a broadcast signal of a channel desired by a user. The tuner 401 outputs the received broadcast signal as a digital broadcast stream.

The structures and operations of the transmission unit 402, the first storage unit 403, the second storage unit 404, the output unit 405, and the control unit 406 are identical to those of the transmission unit 201, the first storage unit 202, the second storage unit 203, the output unit 204, and the control unit 205 of FIG. 2, respectively.

In other words, when requested to store a broadcast stream, the transmission unit 402 transmits a broadcast stream received from the tuner 401 to either the first storage unit 403 or the second storage unit 406 under the control of the control unit 406. When the request for the storage of a broadcast stream is received, or when the request for the output of a broadcast stream is received after the request for the storage of the broadcast stream, the operations of the transmission unit 402, the first storage unit 403, the second storage unit 404 and the output unit 405, and the operation of the control unit 406 controlling the same are identical to those of the transmission unit 201, the first storage unit 202, the second storage unit 203, the output unit 204, and the control unit 205, respectively.

However, when the request for the storage of a broadcast stream is not received, the broadcast stream data output from the tuner 401 is transmitted directly to the decoder 407 through a line 408.

When requested to output a broadcast stream after the request for the storage of a broadcast stream is received, the decoder 407 decodes broadcast stream data output from the output unit 405 and outputs a decoded broadcast stream data. However, when the TV operates in normal broadcast receiving mode, the decoder 407 decodes broadcast stream data transmitted from the tuner 401 through the line 408 and outputs a decoded broadcast stream data.

The TVs of FIGS. 3 and 4 may further include renderers rendering a decoded broadcast stream data from the decoders 306 and 407, respectively.

The transmission units 201 and 402 of FIGS. 2 and 4 may be implemented as switches, and the output units 204, 304, and 405 of FIGS. 2 through 4 may also be implemented as switches like the output unit 103 of FIG. 1. The first storage units 202, 302, and 403 of FIGS. 2 through 4 may be memories such as flash memories and the second storage units 203, 303, and 404 may be recording media such as HDDs.

Figure 5:
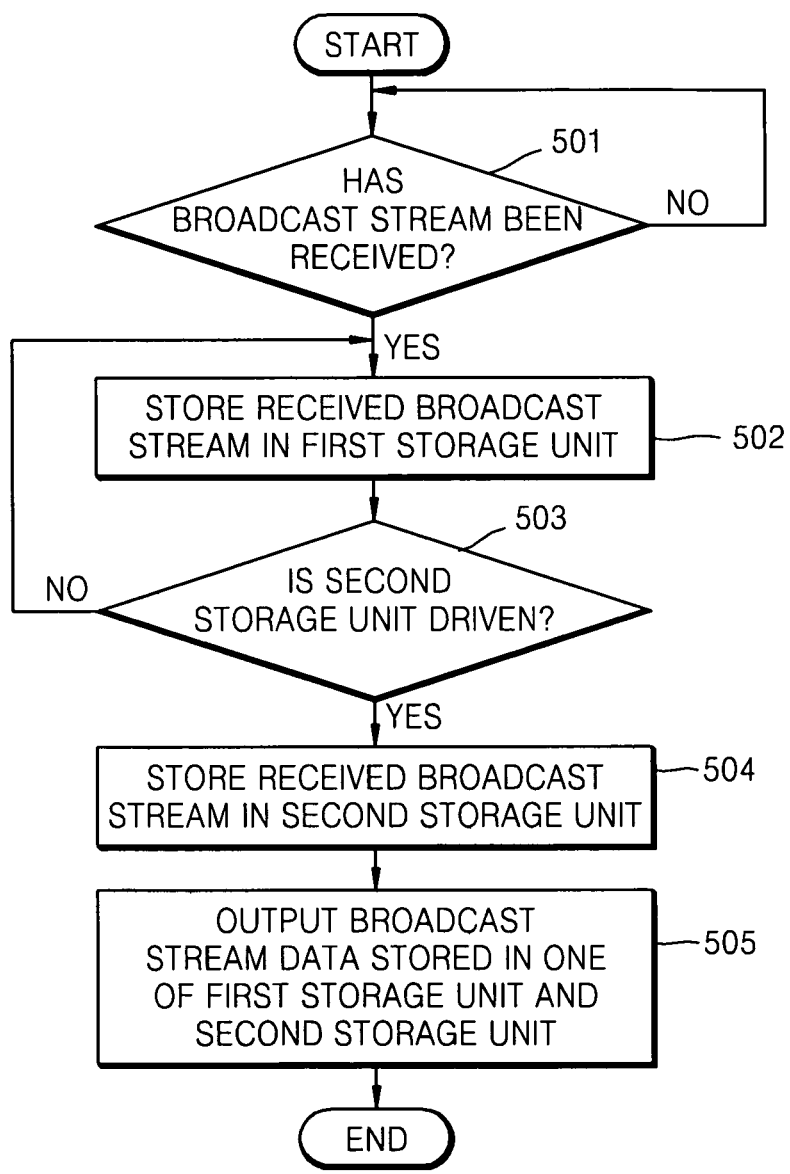
FIG. 5 is a flowchart illustrating an AV signal (or a broadcast stream) storage method according to an exemplary embodiment of the present invention.

FIG. 5 is a flowchart illustrating a broadcast stream storage method according to an exemplary embodiment of the present invention. The flowchart of FIG. 5 will now be described with reference to FIG. 1.

When a broadcast stream is received, the control unit 104 stores the received broadcast stream in the first storage unit 101 (operations 501 and 502).

If it is determined that the second storage unit 102 is being driven (operation 503), the control unit 104 stores the received broadcast stream in the second storage unit 102 (operation 504).

When requested to output a broadcast stream, the control unit 104 outputs broadcast stream data stored in either the first storage unit 101 or the second storage unit 102 (operation 505).

Figure 6:
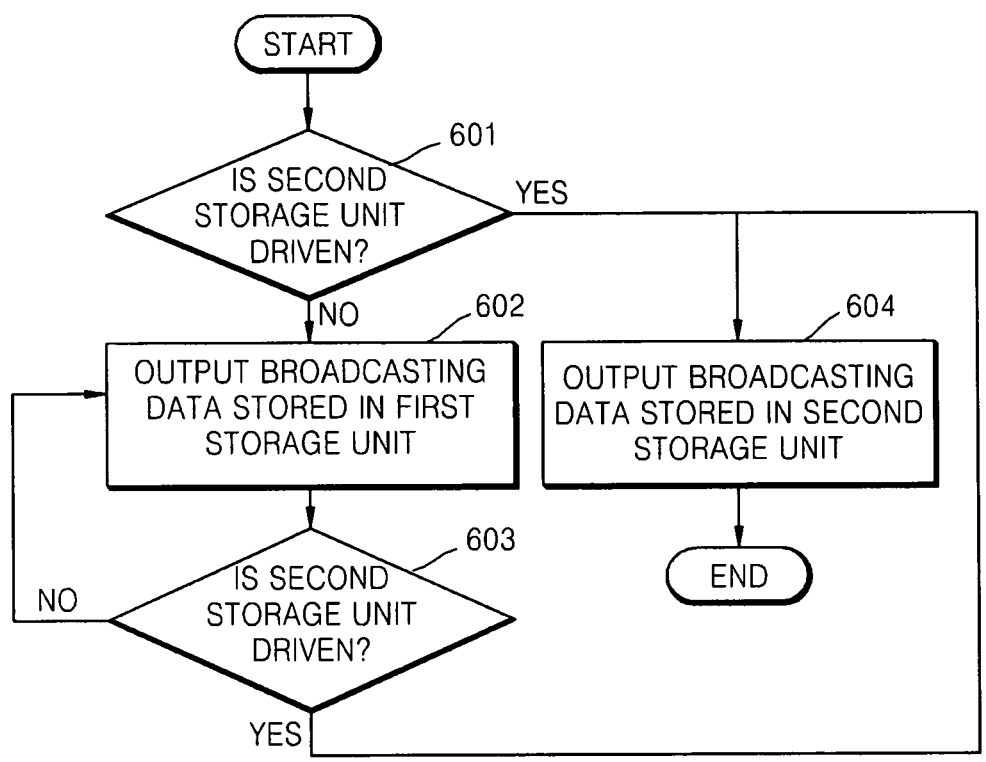
FIG. 6 is a flowchart illustrating in more detail a data output process performed in operation 505 of FIG. 5.

FIG. 6 is a flowchart illustrating in more detail a data output process performed in operation 505 of FIG. 5. Referring to FIG. 6, firstly, it is checked whether the second storage unit 102 is driven (operation 601). The driving of the second storage unit 102 has been described above with reference to FIG. 1.

If it is determined that the second storage unit 102 is not being driven, the control unit 104 controls the operation of the broadcast stream storage apparatus so that broadcast stream data stored in the first storage unit 101 can be output through the output unit 103 (operations 601 and 602).

The control unit 104 checks whether the second storage unit 102 is being driven (operation 603). If the control unit 104 determines that the second storage unit 102 is not being driven, the control unit 104 controls the operation of the broadcast stream storage apparatus so that the broadcast stream data stored in the first storage unit 101 can be output through the output unit 103 (operations 602 and 603).

However, after operation 601 or 603, if it is determined that the second storage unit 102 is being driven, the control unit 104 controls the operation of the broadcast stream storage apparatus so that broadcast stream data stored in the second storage unit 102 can be output through the output unit 103 (operation 604). In this case, the second storage unit 102 is in the normal driving state after the second storage unit 102 completes the initial driving operation.

Figure 7:
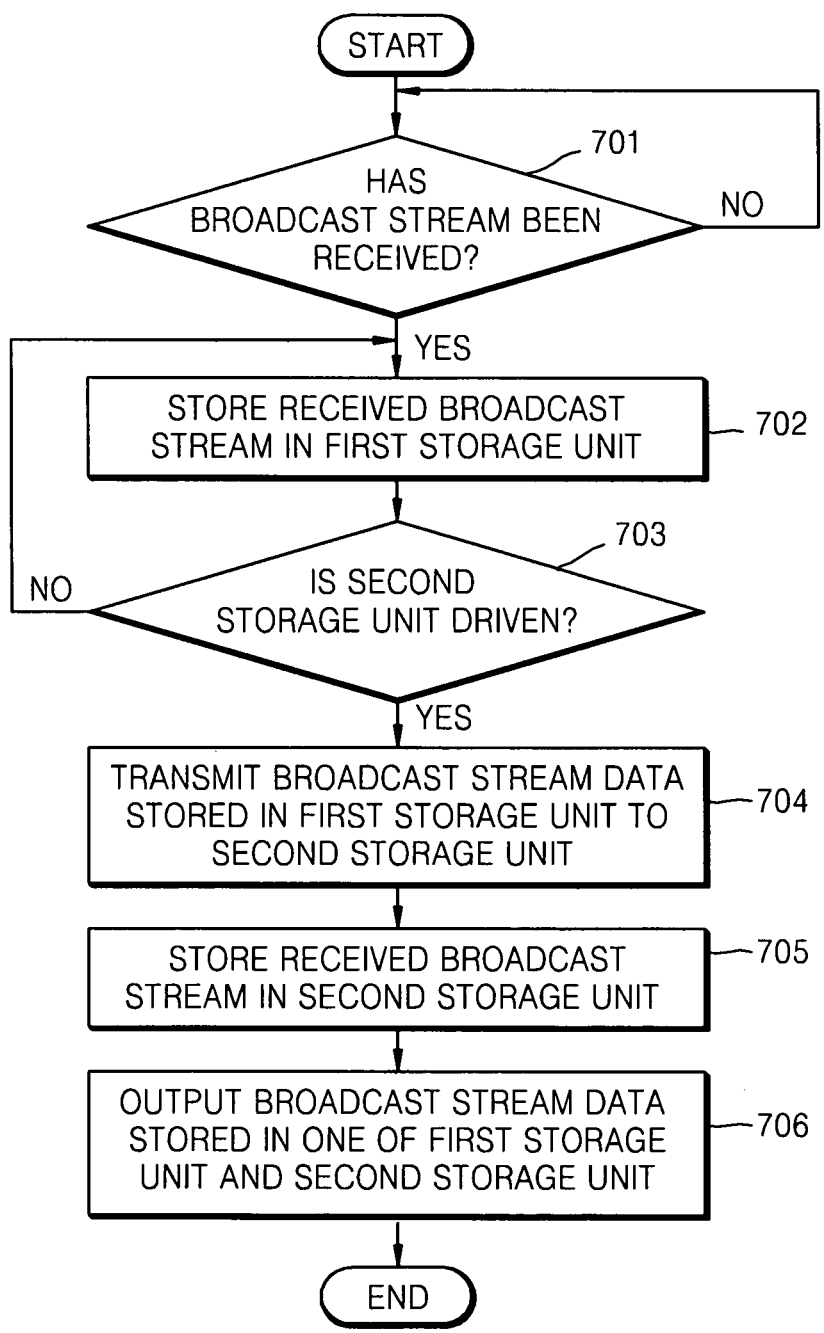
FIG. 7 is a flowchart illustrating an AV signal (or a broadcast stream) storage method according to another exemplary embodiment of the present invention.

FIG. 7 is a flowchart illustrating a broadcast stream storage method according to another exemplary embodiment of the present invention. The flowchart of FIG. 7 will now be described with reference to FIG. 1.

Operations 701 through 703 of FIG. 7 are identical to operations 501 through 503 of FIG. 5, respectively. In addition, operations 705 and 706 of FIG. 7 are identical to operations 504 and 505 of FIG. 5, respectively.

The exemplary embodiments of FIGS. 5 and 7 are different since the exemplary embodiment of FIG. 7 further includes operation 704 in which broadcast stream data stored in the first storage unit 101 is transmitted to the second storage unit 102 when the second storage unit 102 is driven. In this case, the broadcast stream data stored in the first storage unit 101 is transmitted to the second storage unit 102 as illustrated in FIG. 1.

Figure 8:
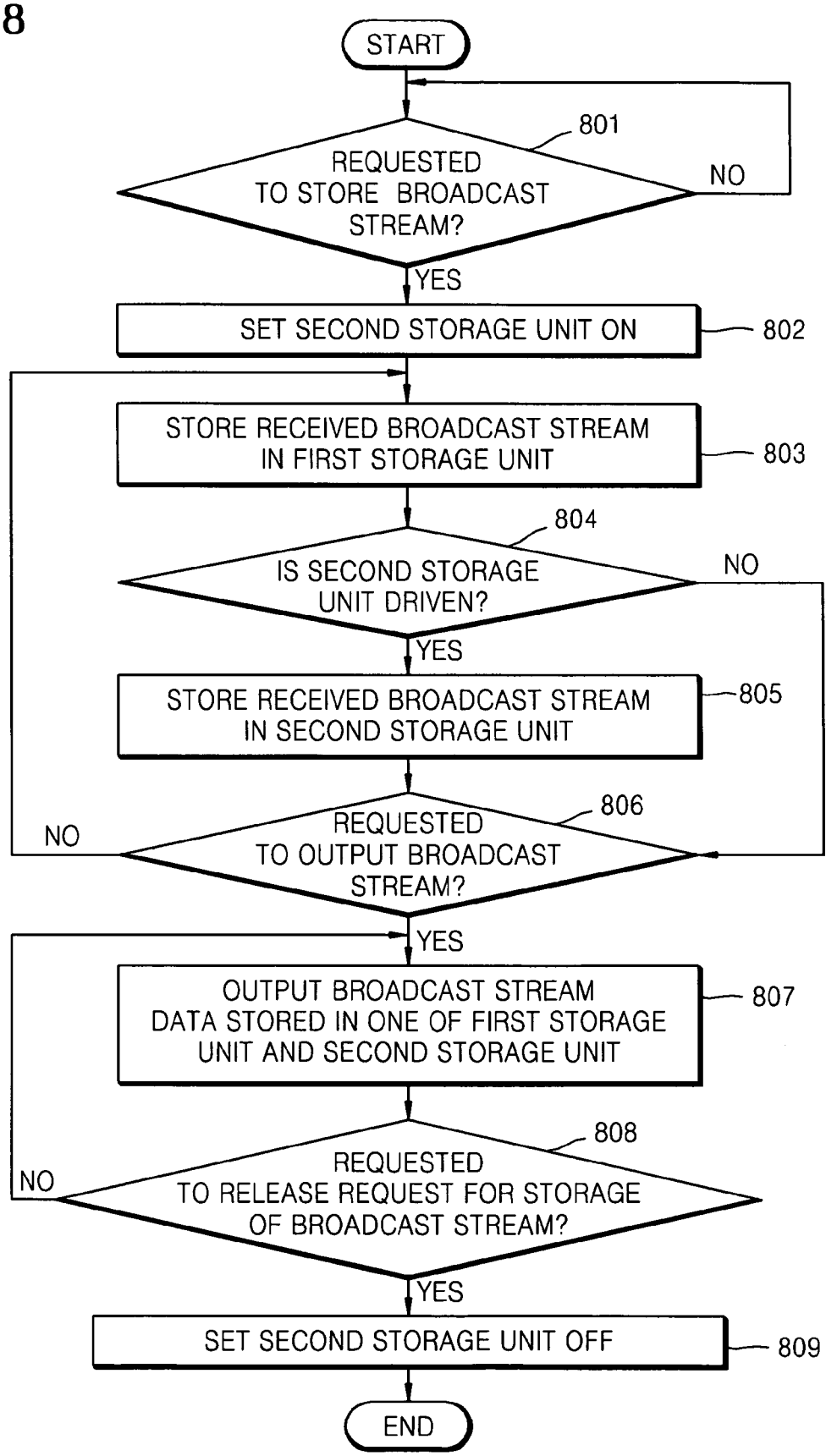
FIG. 8 is a flowchart illustrating an AV signal (or a broadcast stream) storage method according to another exemplary embodiment of the present invention.

FIG. 8 is a flowchart illustrating a broadcast stream storage method according to another exemplary embodiment of the present invention. The flowchart of FIG. 8 will now be described with reference to FIG. 1.

When requested to store a broadcast stream, the control unit 104 sets the second storage unit 102 on and stores the received broadcast stream in the first storage unit 101 (operations 801 through 803).

When the second storage unit 102 completes the initial driving operation and is driven normally, the control unit 104 stores the received broadcast stream in the second storage unit 102 (operations 804 and 805). Then, the control unit 104 checks whether the request for the output of a broadcast stream has been received in operation 806.

However, when the second storage unit 102 has not completed the initial driving operation and thus is not driven normally, the control unit 104 checks whether the request for the output of a broadcast stream has been received (operation 806).

If it is determined that the request for the output of a broadcast stream has been received in operation 806, the control unit 104 outputs broadcast stream data stored in one of the first storage unit 101 and the second storage unit 102 (operation 807). If the request for the storage of a broadcast stream is generated by a pause event, the request for the output of a broadcast stream is generated by a pause releasing event.

If it is determined that the request for the output of a broadcast stream has not been received in operation 806, the control unit 104 continues performing operation 803. Therefore, the control unit 104 repeats operations 804 through 806 while storing received broadcast streams in the first storage unit 101.

The control unit 104 checks whether a user has requested to release the request for the storage of a broadcast stream (operation 808). If it is determined that the user has not requested to release the request for the storage of the broadcast stream in operation 808, the control unit 104 performs operation 807 again. However, if it is determined that the user has requested to release the request for the storage of the broadcast stream, the control unit 104 sets the second storage unit 102 off, thereby stopping the second storage unit 102 from driving.

Figure 9:
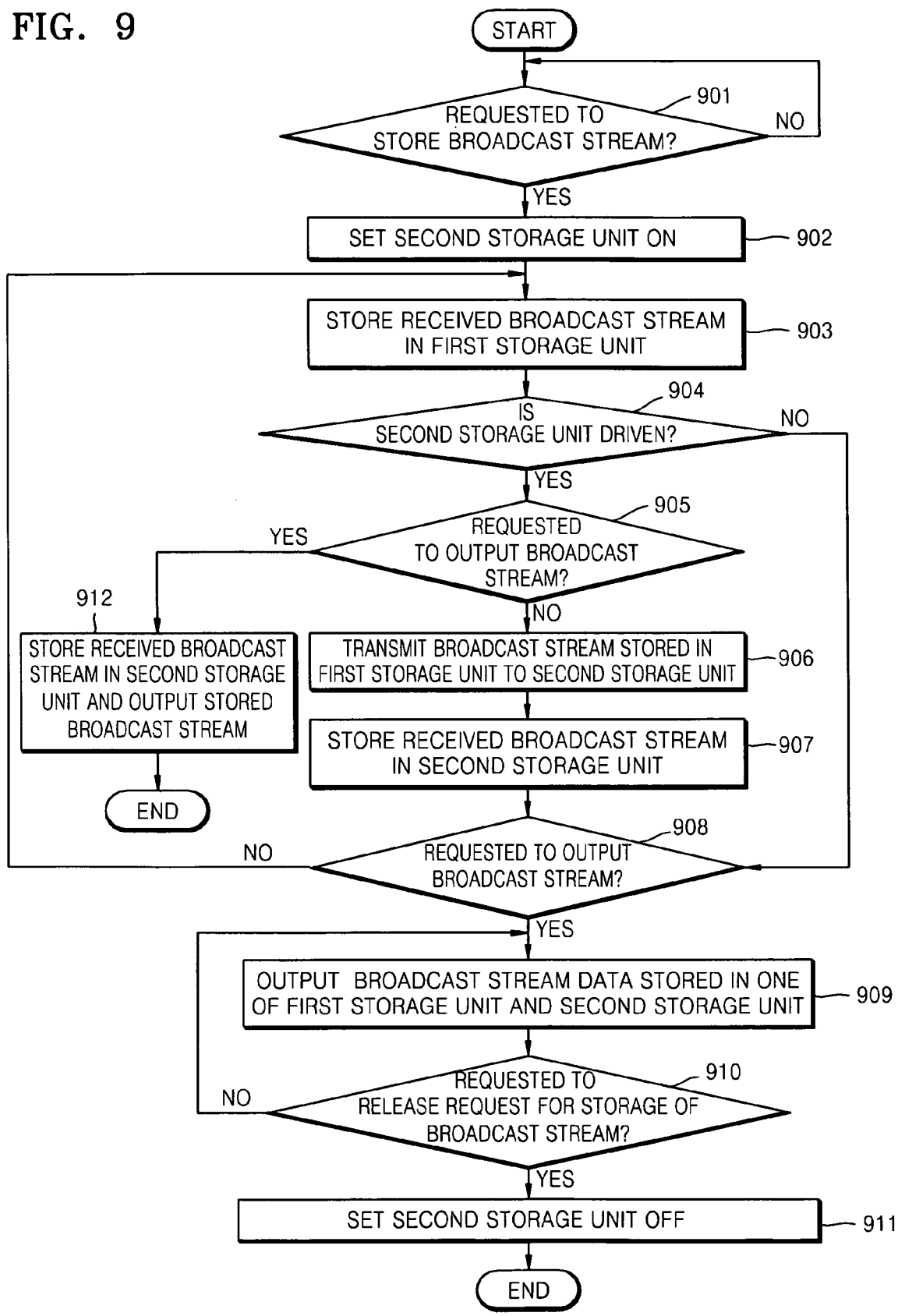
FIG. 9 is a flowchart illustrating an AV signal (or a broadcast stream) storage method according to another exemplary embodiment of the present invention.

FIG. 9 is a flowchart illustrating a broadcast stream storage method according to another exemplary embodiment of the present invention. The flowchart of FIG. 9 will now be described with reference to FIG. 1.

Operations 901 through 904 of FIG. 9 are identical to operations 801 through 804 of FIG. 8, respectively. In addition, operations 908 through 911 performed when it is determined that the second storage unit 102 is not driven normally in operation 904 are identical to operations 806 through 809 of FIG. 8, respectively.

If it is determined that the second storage unit 102 is driven normally in operation 904, the control unit 104 checks whether the broadcast stream storage apparatus has received the request for the output of a broadcast stream (operation 905). If it is determined that the request for the output of the broadcast stream has not been received, broadcast stream data stored in the first storage unit 101 is transmitted to the second storage unit 102 (operation 906). Here, the broadcast stream data stored in the first storage unit 101 may be dumped to the second storage unit 102.

Then, the control unit 104 stores received broadcast streams in the second storage unit 102.

If it is determined that the request for the output of the broadcast stream has been requested in operation 905, the control unit 104 stores received broadcast streams in the second storage unit 102 while controlling the operation of the broadcast stream storage apparatus so that broadcast stream data stored in the second storage unit 102 can be output (or reproduced) through the output unit 103 (operation 912).

If the request for the storage of a broadcast stream is generated by a pause event, the request for the output of a broadcast stream is generated by a pause releasing event.

Figure 10:
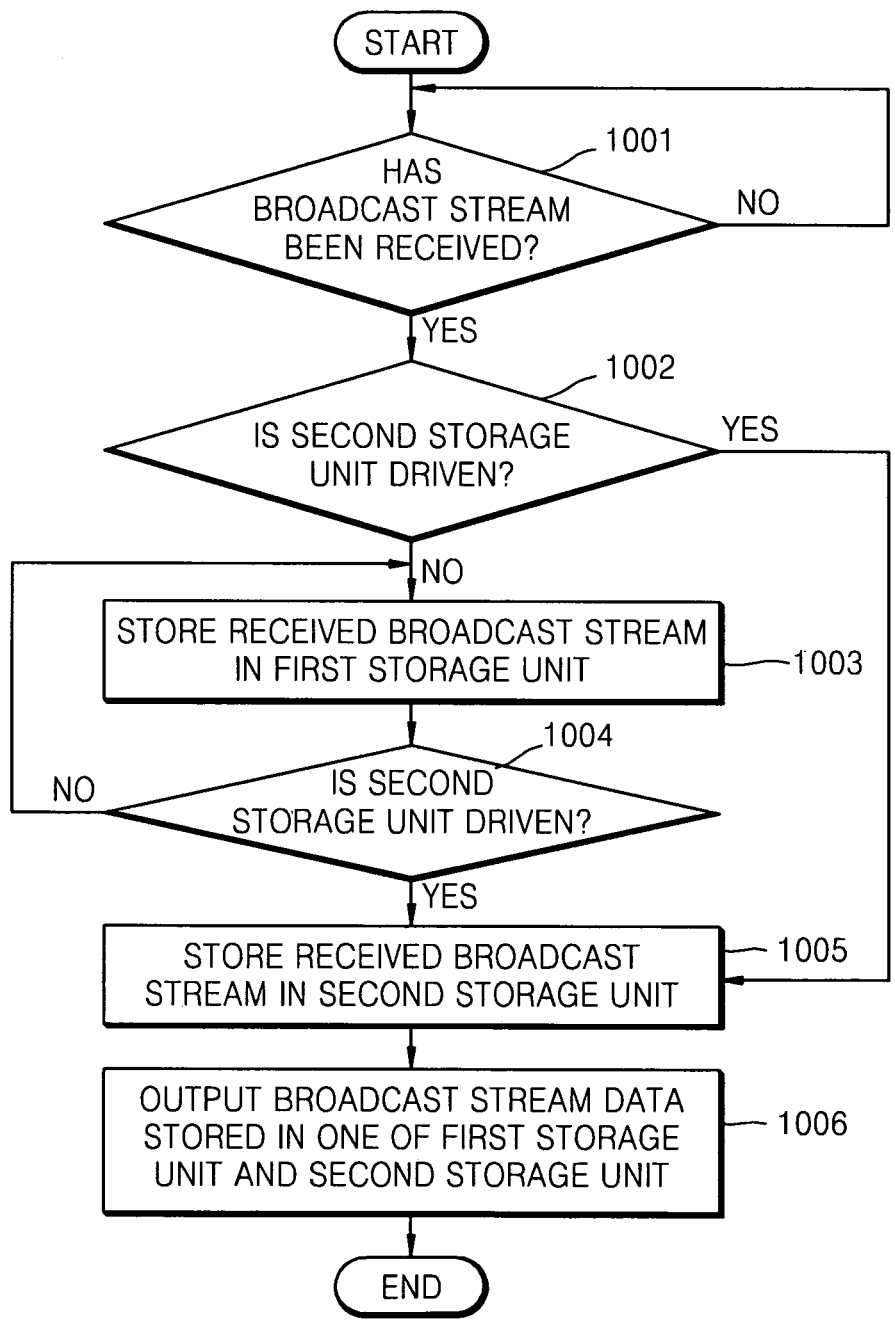
FIG. 10 is a flowchart illustrating an AV signal (or a broadcast stream) storage method according to another exemplary embodiment of the present invention.

FIG. 10 is a flowchart illustrating a broadcast stream storage method according to another embodiment of the present invention. The flowchart of FIG. 10 will now be described with reference to FIG. 1.

When a broadcast stream is received, it is checked whether the second storage unit 102 is driven (operations 1001 and 1002). The operation of the second storage unit 102 has been described above with reference to FIG. 1. If it is determined that the second storage unit 102 is not driven, broadcast streams received in operation 1003 are stored in the first storage unit 101.

Subsequent operations 1004 through 1006 are identical to operations 503 and 505 of FIG. 5, respectively.

If it is determined that the second storage unit 102 is driven in operation 1002, the control unit 104 performs operations 1005 and 1006, which corresponds to operations 504 and 505 of FIG. 5.

The flowchart of FIG. 10 may further include an operation, in which the broadcast stream data stored in the first storage unit 101 is transmitted to the second storage unit 102, between operations 1004 and 1005.

As described above, an apparatus having a broadcast stream storage function consistent with the present invention can store a received broadcast stream using two storage units and thus lengthen the life of the storage units. Therefore, the number of recalls due to the short life of the storage units can be reduced, and the life of the apparatus can be lengthened.

For example, an apparatus consistent with the present invention may provide a PVR system and a TV having a PVR function. Since the PVR system and the TV store a broadcast stream using additional memory and an HDD, the life of the HDD can be lengthened. In addition, the number of recalls due to the short life of HDDs can be reduced and the life of the PVR system and the TV having the PVR function can be lengthened.

The PVR system and TV having a PVR function may receive and reproduce a broadcast stream using additional memory before an HDD is driven normally. Therefore, the received broadcast stream can be prevented from being lost during the initial driving operation of the HDD and output delay of the received broadcast stream can be prevented as well.

Even if the present invention as above described discloses a TV having an AV signal storage function, the present invention can be applied to all apparatuses for storing and reproducing AV signal.

Apparatuses and methods consistent with the present invention can also be implemented as computer-readable code on a computer-readable recording medium. The computer-readable recording medium can be any data storage device that can store data which can be thereafter read by a computer system. Examples of the computer-readable recording medium include, but are not limited to read-only memory (ROM), random-access memory (RAM), CD-ROMs, magnetic tapes, floppy disks, optical data storage devices, and carrier waves (such as data transmission through the Internet).

The computer-readable recording medium can also be distributed over network-coupled computer systems so that the computer-readable code is stored and executed in a distributed fashion.

While apparatuses and methods consistent with the present invention have been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An AV (Audio Video) signal storage method used by an apparatus which comprises a first storage unit and a second storage unit, the method comprising:
receiving a request for storing a received AV signal;
determining whether the second storage unit is driven or not;
if the second storage unit is not driven, performing both storing the received AV signal in the first storage unit and initiating driving operation of the second storage unit; and
if the second storage unit is driven, performing transmitting the received AV signal stored in the first storage unit to the second storage unit, storing the received AV signal in the second storage unit, and storing at least one future received AV signal directly in the second storage unit without the at least one future received AV signal being stored in the first storage unit, said at least one future received AV signal having been received at the apparatus subsequent to the second storage unit being driven.

2. The method of claim 1, further comprising outputting the AV signal, wherein the outputting the AV signal comprises outputting the AV signal stored in the first storage unit to the output unit if the second storage unit is not being driven normally, and outputting the AV signal stored in the second storage unit to the output unit if the second storage unit is being driven normally.

3. The method of claim 2, further comprising performing the initial driving operation of the second storage unit if a request for the storage of the received AV signal is received.

4. The method of claim 1, further comprising performing the initial driving operation of the second storage unit if a request for the storage of the received AV signal is received.

5. The method of claim 4, further comprising stopping a driving operation of the second storage unit if a request to release the request for the storage of the received AV signal is received.

6. The method of claim 1, further comprising transmitting the received AV signal to the first storage unit if the second storage unit is not being driven normally and transmitting the received AV signal to the second storage unit if the second storage unit is being driven normally.

7. The method of claim 6, wherein the first storage unit is a memory and the second storage unit is a hard disk drive.

8. The method of claim 1, further comprising:
transmitting the AV signal stored in the first storage unit to the second storage unit, and storing the received AV signal in the second storage unit when the initial driving operation of the second storage unit is completed, the second storage unit is being driven normally, and the AV signal is not being requested to be output; and
storing the received AV signal in the second storage unit and outputting the received AV signal from the second storage unit when the initial driving operation of the second storage unit is completed, the second storage unit is being driven normally, and the AV signal is requested to be output.

9. An AV (Audio Video) signal storage apparatus comprising:
a first storage unit which stores a received AV signal until an initial driving operation of a second storage unit is completed;
the second storage unit which stores the received AV signal when an initial driving operation of the second storage unit is completed; and
a control unit which determines whether the second storage unit is driven or not and if the initial driving operation of the second storage unit is not completed, controls operation of performing both storing the received AV signal in the first storage unit and initiating driving operation of the second storage unit, else performing transmitting the received AV signal stored in the first storage unit to the second storage unit, storing the received AV signal, and storing at least one future received AV signal directly in the second storage unit without the at least one future received AV signal being stored in the first storage unit, said at least one future received AV signal having been received at the AV signal storage apparatus subsequent to the initial driving operation of the second storage unit being completed.

10. The apparatus of claim 9 further comprising an output unit and a control unit which controls operations of the first storage unit, the second storage unit, and the output unit according to whether the second storage unit is being driven normally and controls the operation of the output unit if the request for the output of the AV signal is received.

11. The apparatus of claim 10, wherein the output unit outputs the AV signal stored in the first storage unit if the second storage unit is not being driven normally, and outputs the AV signal stored in the second storage unit if the second storage unit is being driven normally.

12. The apparatus of claim 10, wherein the initial driving operation of the second storage unit is performed if a request for the storage of the received AV signal is received.

13. The apparatus of claim 12, wherein the second storage unit stops a driving operation if a request to release the request for the storage of the received AV signal is received.

14. The apparatus of claim 10, further comprising a transmission unit transmitting the received AV signal to the first storage unit if the second storage unit is not being driven normally, and transmitting the received AV signal to the second storage unit if the second storage unit is being driven normally.

15. The apparatus of claim 14, wherein the first storage unit is a memory and the second storage unit is a hard disk drive.

16. The apparatus of claim 9, further comprising an output unit, wherein the output unit outputs the AV signal stored in the first storage unit if the second storage unit is not being driven normally, and outputs the AV signal stored in the second storage unit if the second storage unit is being driven normally.

17. The apparatus of claim 16, wherein the initial driving operation of the second storage unit is performed if a request for the storage of the received AV signal is received.

18. The apparatus of claim 9,
wherein the second storage unit stores the AV signal which has been transmitted from the first storage unit, when the AV signal is not being requested to be output, and
wherein the second storage unit stores the received AV signal and outputs the received AV signal from the second storage unit, when the AV signal is requested to be output.

* * * * *